Figure 1:
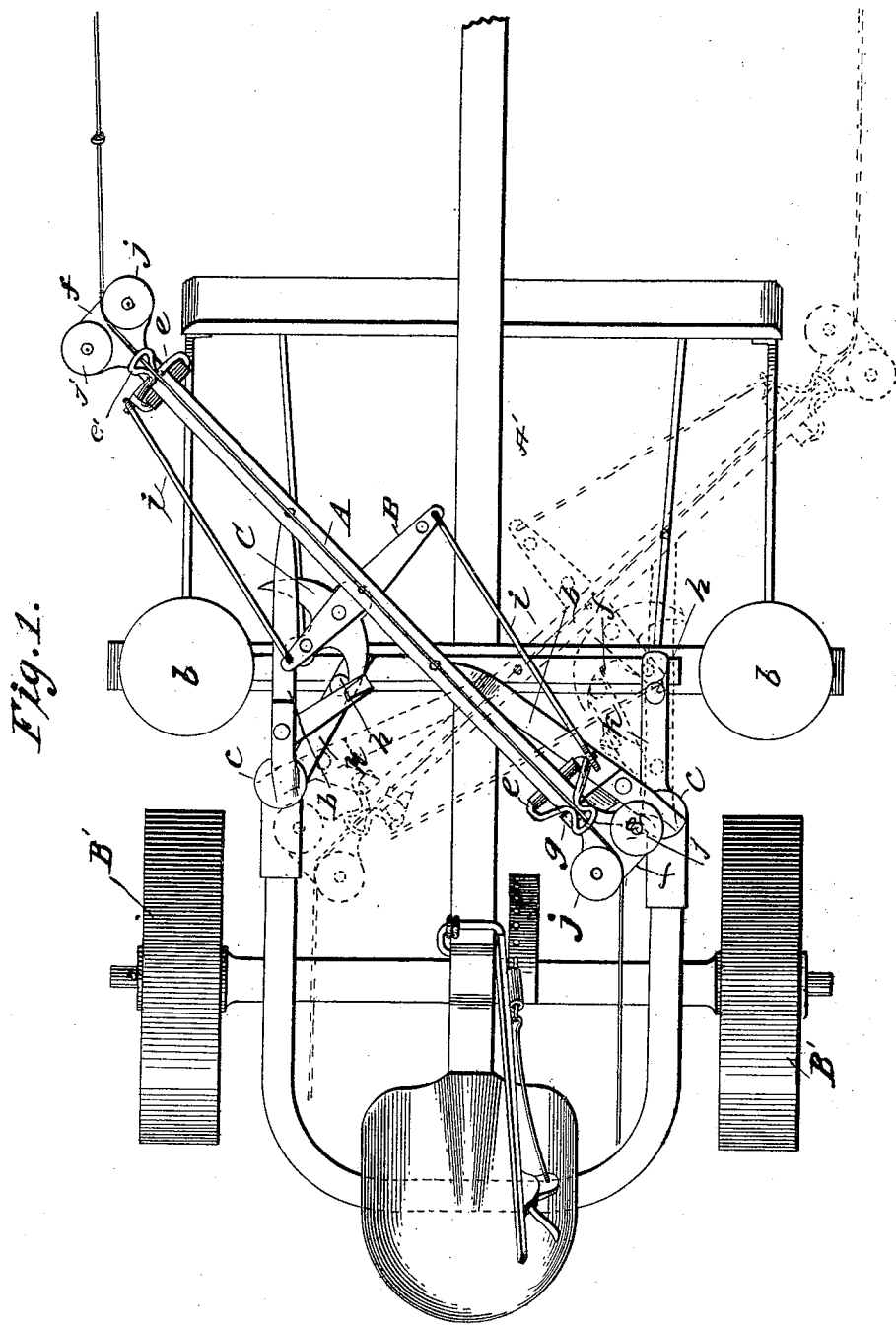

(No Model.) 2 Sheets—Sheet 1.

J. W. PARKER.
CHECK ROW CORN PLANTER.

No. 461,707. Patented Oct. 20, 1891.

Witnesses:
William Storey
PM Carnahan

Inventor:
James W. Parker (No Model.) 2 Sheets—Sheet 2.
J. W. PARKER.
CHECK ROW CORN PLANTER.
No. 461,707. Patented Oct. 20, 1891.
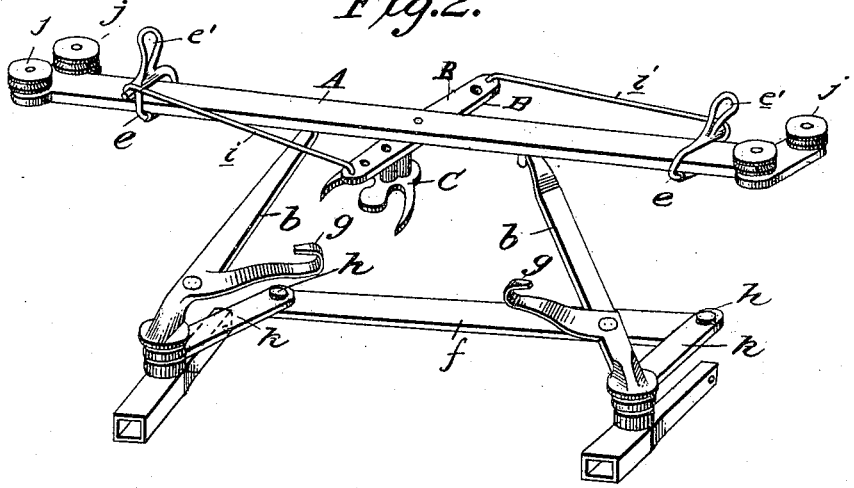
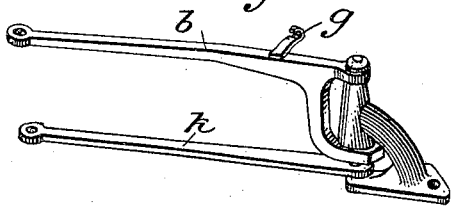
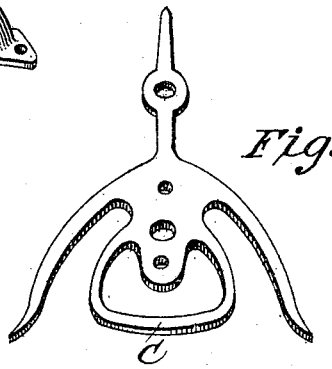
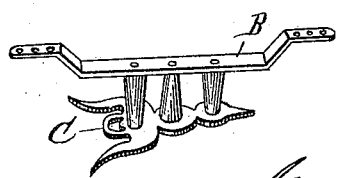
Witnesses:
P. H. Carnahan
B. J. Swonson
Inventor:
James W. Parker

UNITED STATES PATENT OFFICE.

JAMES W. PARKER, OF VIOLA, ILLINOIS.

CHECK-ROW CORN-PLANTER.

SPECIFICATION forming part of Letters Patent No. 461,707, dated October 20, 1891.

Application filed January 7, 1891. Serial No. 380,628. (No model.)

*To all whom it may concern:*

Be it known that I, JAMES W. PARKER, a citizen of the United States, residing at Viola, in the county of Mercer and the State of Illinois, have invented a new and useful Improvement in Check-Row Corn or Seed Planters, of which the following is a specification.

My invention has relation to improvements in check-row corn-planters; and it consists in the peculiar construction of certain novel combinations and adaptation of parts hereinafter described, and particularly pointed out in the claims appended.

In the accompanying drawings, Figure 1 is a plan view of a corn-planter with my improvements in an operative position thereon. Fig. 2 is a perspective view of the check-row mechanism removed. Fig. 3 is a detail perspective view of one of the pivoted supporting-arms and one of the links for connecting my improved mechanism to the reciprocating seed-slide of the planter. Fig. 4 is a perspective plan view of the cam for transmitting motion to the seed-slide, and Fig. 5 is a perspective view of the cam and cam-lever.

In the said drawings similar letters designate corresponding parts in all of the several views, referring to which—

A' indicates the main frame of a corn-planter, which may be of the ordinary or any approved construction, and B' indicates the bearing-wheels thereof. Pivotally connected at one end to the main frame of the planter A' at suitable points with respect to the seed-slide thereof are the supporting-arms *b* of my improved check-row mechanism, which are connected adjacent their opposite ends to the laterally-oblique guide-bar A, which is provided at its ends with guide-sheaves *j*, between which takes the wire or rope provided with knobs or buttons at suitable intervals in its length. Pivotally connected to the guide-bar A, adjacent the middle thereof, is the cam-lever B, which is provided adjacent its respective ends with apertures for the adjustable connection of one end of connecting-rods *i*, which are connected at their opposite ends to the loop-levers *e*, which are better illustrated in Fig. 2 of the drawings. These levers *e*, which preferably embrace the guide-bar A, are fulcrumed to said bar, as illustrated, and are provided with the tapering loop branch *e'*, through which takes the wire or rope carrying the check knobs or buttons.

Suitably connected to the cam-lever B between the fulcrum-point and one end thereof is the cam C, which comprises the fork branches and the central cam portion, between which are afforded guide-slots in which move the friction-pulleys *h*, which are journaled on the links *k* at or adjacent the pivotal connection of said links to the transverse bar *f* or to the reciprocating seed-slide, whereby reciprocatory movement is imparted to the said slide. The links *k* are preferably connected in a pivoted manner at their opposite ends in the same casting as the supporting-arms *b*, before described.

Preferably formed integral with the supporting-arms *b* and extending laterally oblique therefrom are branches *g*, which are provided with hooks at their free ends and serve, in practice, to limit the adjustment of the guide-bar A, as well as to hold said bar in its operative position. By reason of their connection to the cam-lever B it will be readily seen that the loop-levers *e*, through which the rope passes, are pitched in opposite directions when at rest.

In operation the buttons or knobs on the check-rope first engage the nearest loop-lever and swing the same toward the cam-lever, which moves the said lever and the cam, which in turn moves the seed-slide in one direction. The inward movement of the nearest loop-lever draws the other loop-lever inward ready to be engaged by each knob or button on the rope after said knob passes through the nearest loop, whereby it will be seen that the seed-slide of the planter will be moved in an opposite direction from the movement caused by the engagement of the nearest loop-lever, and when the machine is in operation the seed-slide will be reciprocated at a speed corresponding to the length of the intervals between the knobs or buttons on the check-rope.

By the peculiar arrangement of the guide-bar A with respect to the planter it will be perceived that the objectionable bending of the wire or rope is avoided, as well as side draft, which tends to cause frictional wear and breaking of the rope. Through the peculiar arrangement of the guide-bar and other parts of the mechanism it will also be seen that the rope or wire will be lifted from the ground in a line with the guide-sheaves on the forward end of the guide-bar and will be laid on the ground in alignment with the sheaves at the rear end of said guide-bar in position for the return trip of the planter.

When the planter is turned at the completion of a row to begin a new row, the guide-bar A is swung around, so that its forward end will rest on the right-hand side of the planter and the cam will engage the friction-pulley on the same side of the planter.

Although I have specifically described the construction and relative arrangement of the several parts of my improved corn-planter, yet I do not desire to be confined to such precise construction, as in practice such modifications may be made as fairly fall within the scope of my invention.

Having described my invention, what I claim, and desire to secure by Letters Patent, is—

1. In a check-row corn-planter, the combination, with the main frame, of the arms pivoted at one end to said frame, the guide-bar pivotally supported on the outer ends of said arms, the arms being connected to the guide-bar in such a manner as to sustain the same in opposite oblique positions when moved on their bearings, and the hook-arms attached to the supporting-arms and adapted to engage the guide-bar, substantially as specified.

2. In a check-row corn-planter, the combination, with the main frame and the seed-slide thereof, of the supporting-arms pivotally connected at one end to the main frame, the guide-bar pivotally connected to the opposite ends of said arms, the loop-levers connected to said guide-bar, the beam-lever fulcrumed upon the guide-bar between the loop-levers, rods connecting the ends of the beam-lever to the loop-levers, and suitable mechanism connected to the beam-lever and adapted to engage and move the seed-slide, substantially as described.

3. In a check-row corn-planter, the combination, with the main frame, of the supporting-arms pivotally connected thereto at one end and having laterally-oblique branches provided with loops at their free ends, and the guide-bar pivotally connected to the opposite ends of the supporting-arms and adapted to be engaged by the branches of said arm and held in a transversely-oblique position during operation, substantially as and for the purpose set forth.

4. In a check-row corn-planter, substantially as described, the combination, with a guide-bar or other support and loop-lever fulcrumed on said bar and adapted to receive the check-rope and be actuated by the knobs or buttons thereon, of the beam-cam lever fulcrumed on the guide-bar intermediate of the loop-levers, rods connecting the cam-lever and the loop-levers, and the cam connected to the cam-lever and adapted to engage and move the seed-slide, substantially as and for the purpose set forth.

Witness my hand this 31st day of January, 1891.

JAMES W. PARKER.

Attest:
J. B. LONGLEY,
M. B. KENNEDY.